Dec. 9, 1952        W. F. STAHL        2,620,944
PLASTIC CONTAINER
Filed Jan. 21, 1949        2 SHEETS—SHEET 1
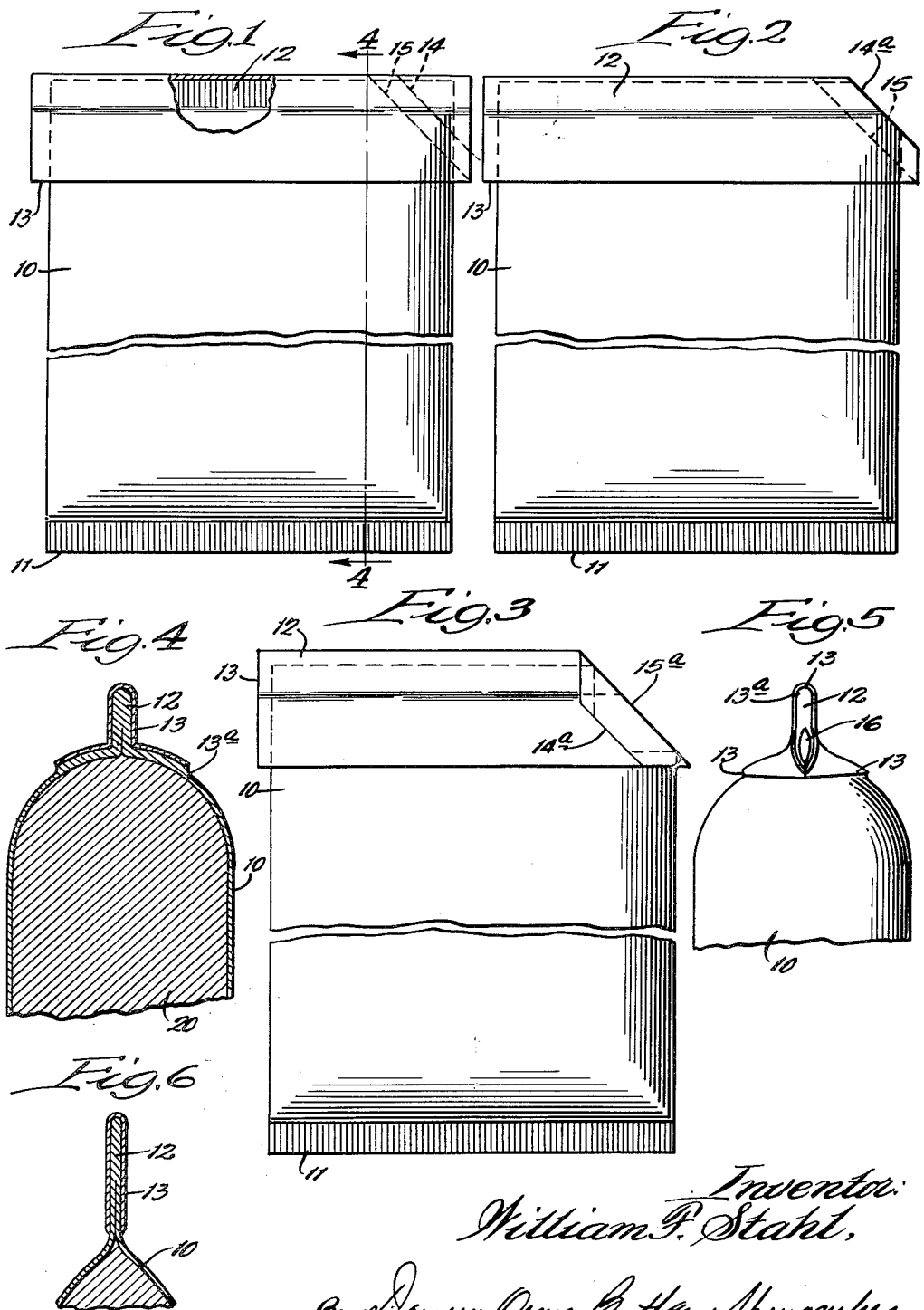

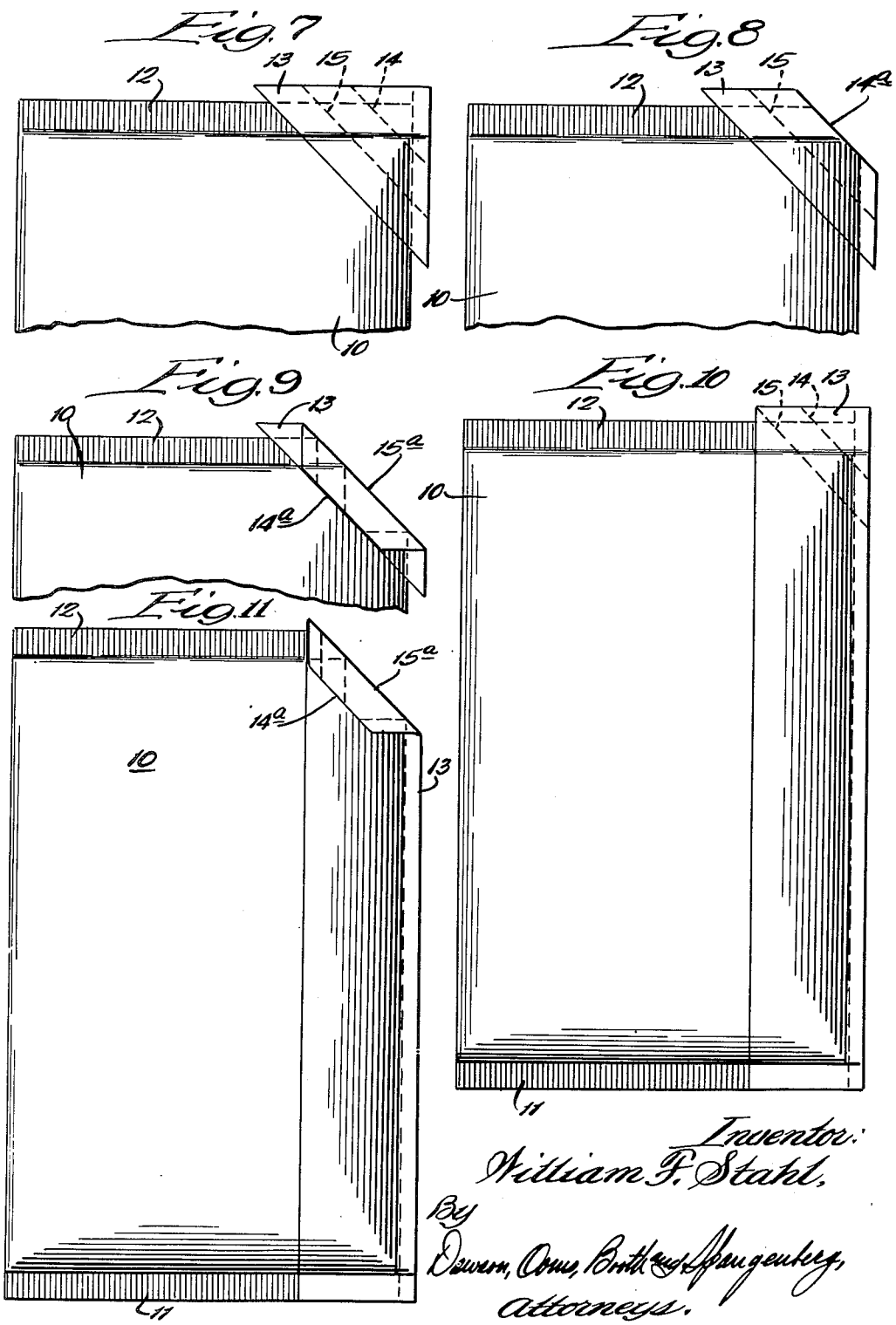

Patented Dec. 9, 1952

2,620,944

UNITED STATES PATENT OFFICE 2,620,944

PLASTIC CONTAINER

William F. Stahl, Kenilworth, Ill.

Application January 21, 1949, Serial No. 71,872

2 Claims. (Cl. 222—107)

This invention relates to plastic containers; in particular, it concerns a package or bag which may be economically formed from thermoplastic material and which is particularly adapted for receiving mayonnaise, peanut butter, and other semi-liquid materials, particularly foodstuffs.

The advantages of plastic as a material for containers have been widely recognized by industry. The various plastic materials available today are inexpensive and well adapted for mass production, and at the same time they are physically strong and non-porous, so that plastic packages can effectively protect contents against contamination, moisture access, and other causes of deterioration.

As containers for foods, however, plastic packages have in the past had one serious defect. When such packages have once been opened to permit partial removal of their contents, no satisfactory temporary closure for retaining and storing the remaining contents has been possible. This is particularly true with respect to semi-liquid foods, such as mayonnaise, peanut butter, marshmallow cream, and other products of that character.

I have provided an improved plastic container which is admirably adapted for packaging such substances, since it will preserve them effectively for an indefinite period before the container is first opened, and will provide an effective guard against both leakage and contamination during the interval following the first opening of the container and during which its contents are being gradually consumed.

It is an object of my invention to provide an inexpensive container possessing the inherent advantages of conventional plastic containers and having in addition an effective closure means for use after the initial opening of the container.

Another object of my invention is to provide, for a plastic bag, an effective closure means which may be used repeatedly after the initial opening of the bag and which does not add substantially to the cost of the container.

Still another object of my invention is to provide a plastic bag, having an effective closure means suitable for repeated use, which is well adapted to mass production and which is accordingly little more expensive than conventional plastic bags.

Other objects and advantages of my invention will appear as the specification proceeds.

In the accompanying drawings I have shown my invention as applied to plastic containers. Figure 1 is a view in front elevation, partly broken away, of a plastic container embodying my invention; Fig. 2 is another front elevation view of the container of Fig. 1, the corner having been therein cut away for initial opening of the bag and partial removal of its contents; and Fig. 3 is a view of the same container after it has been re-closed for temporary storage of the remaining contents. Fig. 4 is a view in section, taken along the line 4—4 of Fig. 1; Fig. 5 is a view of the Fig. 2 container, in side elevation, showing more clearly the manner in which the bag is opened for partial removal of its contents. Fig. 6 is a fragmentary sectional view showing an alternative means of forming the closure member on the bag in accordance with my invention. Figs. 7, 8, and 9 are views of a plastic container employing my invention wherein the closure member is applied only to a corner of the bag; Fig. 7 shows the bag as fully sealed, Fig. 8 shows the bag as opened for partial removal of the contents, and Fig. 9 shows the bag with the closure member folded over for temporary storage of the remaining contents. Figs. 10 and 11 show a bag in which the invention is applied with the closure member along the side rather than across the top; Fig. 10 shows the bag as fully sealed and Fig. 11 shows the bag with the closure member folded over for temporary storage after a part of the contents have been removed.

As shown in Figs. 1-5 inclusive, my invention comprises a plastic bag 10, the top and bottom of which have been sealed by thermal sealing after filling. In the figures, the bottom seal of the bag is denoted 11 and the top seal is denoted 12. A closure member 13, consisting of a folded-over strip of metal foil is sealed to the top of bag 10. In the form of my invention shown in Figs. 1-5 inclusive, the closure member 13 has had its inner surface coated by a layer of thermoplastic material which has been, in turn, caused to form an integral bond with the plastic material of the bag proper. This results, as shown best in Fig. 4, in a thickening of the plastic wall beneath the member 13, as denoted 13a in Fig. 4. It will be noted that the sides of member 13 are sealed to the outer surface of the bag 10 to a point substantially beyond the limits of seal 12. This may be best seen in Figs. 4 and 5.

For the convenience of the user, a line 14 may be printed or otherwise placed on the outer face of closure member 13 to guide the user of the bag with respect to making an initial cut for opening the bag and partially removing its contents. Cut line 14 may be placed on the closure member across one corner thereof as shown on Fig. 1; it should be placed in a position such that it traverses a portion of bag 10 below seal 12.

A fold line 15 may be placed on the closure member 13; it may be substantially parallel to cut line 14 and should be substantially further from the corner.

In the operation of my invention, the person desiring to remove a portion of the bag's contents cuts off, with a knife or a pair of scissors, a corner of the closure member and bag, following for the purpose cut line 14, if such a line has been provided. This results in a cut edge 14a which contains an aperture 16 produced as a result of the trimming away of a small part of bag 10 below the seal 12. Such portion of the contents as are to be used at the time can be squeezed from bag 10 through aperture 16. When the bag is to be returned to temporary storage, as in a refrigerator, the closure member 13 is folded sharply over, thus producing a fold line 15a which effectively seals off the cut line 14a and the aperture 16 from the interior of the bag 10. This fold may, of course, be taken along fold line 15, if such a line has been provided on the closure member.

The closure accomplished by fold line 15a is a good temporary seal, since the metal foil employed for closure member 13 has practically no elasticity and will retain a sharp fold for an indefinite period. The properties of such foil are well-known, since it is widely used in the manufacture of tooth paste tubes and like products.

In Fig. 6 an alternative construction of my invention is shown; the principles of operation are identical to those of the Fig. 1 embodiment, but in this form of my invention the metal foil closure member 13 is crimped on the top of bag 10 by mechanical pressure, rather than by being sealed thermally to the outer surface of the bag itself, as in the Fig. 1 form. Normally, the crimping technique of manufacture will call for use of a heavier gauge metal foil than is required when the foil is sealed thermally to the bag. The initial opening of the bag by cutting and folding over of the closure member for temporary sealing after the initial opening may be accomplished with the Fig. 6 form of the invention just as with the Fig. 1 form. The effectiveness of the seal achieved by the folded closure member is substantially the same in either form of the invention.

In Figs. 7-11 inclusive, I have shown alternative orientations of the closure member with respect to the bag proper. It will be understood that these variations may be constructed with either the crimping technique shown in Fig. 6 or the sealing technique of Fig. 4 as the means employed for uniting the closure member and the bag.

In Figs. 7, 8, and 9, the closure member is shown as covering only one corner of the bag 10. This permits the use of less metal foil than is required to extend the closure member entirely across the top, and it accordingly represents a certain measure of economy in construction. Fig. 8 shows the Fig. 7 bag after the initial cutting for bag-opening has been made, and Fig. 9 shows the same bag after it has been folded along line 15a for temporary closure.

Figs. 10 and 11 show a bag wherein the closure member 13 has been affixed along one side, rather than across the top as in Fig. 1. Fig. 10 shows the bag before initial opening, while Fig. 11 shows it as temporarily sealed by folding after partial removal of the contents.

Determination of the position and size of the closure member described herein will be determined in any particular packaging operation by the physical properties of the material to be packed and the portion of the bag which should be mechanically reinforced. If mechanical reinforcement is not important, the small closure member of Fig. 7 may be desirable, because of its economy in the use of metal foil. If it is considered particularly desirable to make the bag semi-rigid vertically, then the form of Fig. 10 may be advisable. In most cases, it is believed that the application of the closure member to the top of the bag, as in Fig. 1, will be most satisfactory. The principle involved is identical in all three cases, and the selection of one of the variations shown, or of some other variation, is entirely a matter of choice.

While I have in this specification, for purposes of illustration, shown my invention in certain specific forms, it will be understood that many variations in details can be made by persons skilled in the art without departing from the spirit of my invention.

I claim:

1. A container adapted for packaging semi-fluids, comprising a plastic bag closed along at least two edges thereof that meet to form a bag corner, a closure member of thin bendable metal having side portions disposed on each side of said bag and enclosing at least said corner of the bag, said member being coated with an adhesive and being bonded to said bag and having edge portions extending outwardly from each of the bag edges also bonded together, said closure member being equipped with a cut line extending obliquely across the bag corner whereby severing along the cut line provides a reinforced discharge opening for the bag, and said closure member also being equipped with a fold line lying inwardly of said cut line whereby folding of said closure member along the fold line seals off said opening from the interior of the bag.

2. A container adapted for packaging semi-fluids, comprising a thermoplastic bag having at least one sealed edge and being closed along another edge meeting with the sealed edge to provide a bag corner, a metal foil closure member having side portions disposed on each side of said bag and enclosing at least said corner of the bag, said member having side portions extending inwardly of the sealed portion of said sealed edge and being coated with a thermoplastic material and heat-sealed integrally to said bag, said member also having edge portions extending outwardly from each of said bag edges and the abutting sides thereof heat-sealed together, said closure member being equipped with a cut line extending obliquely across the bag corner and beyond the sealed portion of said sealed edge whereby severing along the cut line provides a reinforced discharge opening for the bag, and said closure member also being equipped with a fold line lying inwardly of said cut line whereby folding of said closure member along the fold line seals off said opening from the interior of the bag.

WILLIAM F. STAHL.

REFERENCES CITED

The following references are of record in the file of this patent:

UNITED STATES PATENTS

| Number | Name | Date |
| --- | --- | --- |
| 1,767,770 | Olsen | June 24, 1930 |
| 1,910,789 | Brady | May 23, 1933 |
| 2,093,974 | Farmer | Sept. 21, 1937 |
| 2,093,978 | Farmer | Sept. 21, 1937 |
| 2,333,587 | Salfisberg | Nov. 2, 1943 |
| 2,369,716 | Coghill | Feb. 20, 1945 |
| 2,400,390 | Clunan | May 14, 1946 |

FOREIGN PATENTS

| Number | Country | Date |
| --- | --- | --- |
| 392,519 | Great Britain | Aug. 13, 1931 |